(12) United States Patent
Ono et al.

(10) Patent No.: US 7,926,601 B2
(45) Date of Patent: Apr. 19, 2011

(54) VEHICLE MOUNTING STRUCTURE FOR FUEL CELL SYSTEM

(75) Inventors: Tohru Ono, Kawachi-gun (JP); Takayuki Ogawa, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 708 days.

(21) Appl. No.: 10/586,280

(22) PCT Filed: Jan. 12, 2005

(86) PCT No.: PCT/JP2005/000236
§ 371 (c)(1),
(2), (4) Date: Jul. 18, 2006

(87) PCT Pub. No.: WO2005/068241
PCT Pub. Date: Jul. 28, 2005

(65) Prior Publication Data
US 2008/0283316 A1    Nov. 20, 2008

(30) Foreign Application Priority Data
Jan. 20, 2004  (JP) .................... 2004-011872

(51) Int. Cl.
*B60K 1/04* (2006.01)
(52) U.S. Cl. .................... 180/68.5; 180/65.31
(58) Field of Classification Search ............ 180/291, 180/65.1, 65.3, 68.5; 429/452
See application file for complete search history.

(56) References Cited

U.S. PATENT DOCUMENTS

| | | | |
|---|---|---|---|
| 5,392,873 A * | 2/1995 | Masuyama et al. | 180/68.5 |
| 5,460,234 A * | 10/1995 | Matsuura et al. | 180/65.1 |
| 5,641,031 A | 6/1997 | Riemer et al. | |
| 6,378,637 B1 | 4/2002 | Ono et al. | |
| 6,494,286 B2 * | 12/2002 | Shimizu et al. | 180/299 |
| 6,843,336 B2 * | 1/2005 | Chernoff et al. | 180/65.1 |
| 6,907,947 B2 * | 6/2005 | Morita et al. | 180/65.1 |
| 6,978,855 B2 * | 12/2005 | Kubota et al. | 180/65.3 |
| 6,994,178 B2 * | 2/2006 | Mizuno | 180/65.3 |
| 7,108,091 B2 * | 9/2006 | Guidry et al. | 180/68.1 |
| 7,270,202 B2 * | 9/2007 | Kondo | 180/65.1 |
| 2003/0070858 A1 | 4/2003 | Kondo | |

FOREIGN PATENT DOCUMENTS

| | | |
|---|---|---|
| JP | S50-39528 A1 | 11/1975 |
| JP | 9-118140 | 5/1997 |
| JP | 2000-313239 | 11/2000 |
| JP | 2005-59680 | 3/2005 |
| WO | WO-03/018373 A1 | 3/2003 |
| WO | WO-03/104010 A1 | 12/2003 |

OTHER PUBLICATIONS

Japanese Office Action for Application No. 2004-011872, dated Oct. 30, 2007.
International Search Report for Application No. PCT/JP2005/00236, dated Mar. 1, 2005.
Japanese Office Action for Application No. 2004-011872, dated May 8, 2007.
Chinese Office Action for Application No. 200580002776.6, dated Sep. 14, 2007.

* cited by examiner

*Primary Examiner* — Frank B Vanaman
(74) *Attorney, Agent, or Firm* — Nelson Mullins Riley & Scarborough LLP; Anthony A. Laurentano

(57) ABSTRACT

A vehicle mounting structure for a fuel cell system containing a vehicle floor; a vehicle skeletal member positioned under the vehicle floor, having floor frames provided on the sides of the vehicle body along the longitudinal direction of the vehicle and a plurality of cross members provided in the width direction of the vehicle and connected to the floor frames; and a fuel cell unit and an auxiliary unit of the fuel cell disposed to be adjacent in the longitudinal direction of the vehicle. The fuel cell unit and the auxiliary unit is each sandwiched from both sides in the longitudinal direction of the vehicle by two of the cross members. This vehicle mounting structure for a fuel cell system prevents the length of piping and the length of wiring from becoming excessively long and improves collisional stabilization.

6 Claims, 7 Drawing Sheets

VEHICLE MOUNTING STRUCTURE FOR FUEL CELL SYSTEM

Related Applications

This application is a 35 U.S.C. 371 national stage filing of International Application No. PCT/JP2005/000236, filed 12 Jan. 2005, which claims priority to Japanese Patent Application No. 2004-011872 filed on 20 Jan. 2004 in Japan. The contents of the aforementioned applications are hereby incorporated by reference.

TECHNICAL FIELD

The present invention related to a vehicle mounting structure for a fuel cell system.

Priority is claimed on Japanese Patent Application No. 2004-11872, filed Jan. 20, 2004, the content of which is incorporated herein by reference.

BACKGROUND ART

There is conventionally known a fuel cell vehicle mounted with a fuel cell as a drive power supply, with the fuel cell vehicle traveling by driving an electric traction motor using generated power from the fuel cell.

In such a fuel cell vehicle, the fuel cell is disposed under the vehicle floor in an area defined by two longitudinal beams and two transverse beams of the vehicle frame forming a vehicle skeleton, and auxiliary components of the fuel cell are disposed under the vehicle floor in a region sandwiched by the two transverse beams and outside the region sandwiched by the two longitudinal beams (for example, refer to Patent Document 1).

Patent Document 1: U.S. Pat. No. 5,641,031

DISCLOSURE OF THE INVENTION

Problems to be Solved by the Invention

In the fuel cell vehicle according to the aforementioned conventional technology, since the fuel cell is disposed in a region defined by the vehicle frame, and the auxiliary components of the fuel cell are disposed outside this region, the length of piping that circulates reactant gases between the fuel cell and the auxiliary components can become excessively long. Also, there is the risk of an increase in transmission loss due to the wiring length of the high voltage electrical system consisting of the fuel cell and the fuel cell auxiliary components becoming excessively long.

Moreover, by disposing the auxiliary components of the fuel cell outside the region defined by the vehicle frame, an impact load can more easily act on the auxiliary components of the fuel cell, giving rise to the problem of the auxiliary components of the fuel cell being readily damaged.

The present invention was achieved in view of the aforementioned circumstances, and has as its object to provide a vehicle mounting structure for a fuel cell system that can improve collisional stabilization.

Means for Solving the Problem

In order to solve the aforementioned problems and achieve the object, the present invention provides a vehicle mounting structure for a fuel cell system including: a vehicle floor, a vehicle skeletal member positioned under the vehicle floor having floor frames (floor frames 105 and 106 in the embodiment) provided on sides of a vehicle body along a longitudinal direction of a vehicle and cross members (cross member 104, first cross member 141, second cross member 142, and third cross member 143 in the embodiment) provided in a width direction of the vehicle and connected to the floor frames; and a fuel cell unit (fuel cell 11 in the embodiment) and an auxiliary unit of the fuel cell (auxiliary unit 40 in the embodiments) disposed to be adjacent in the longitudinal direction of the vehicle, wherein the fuel cell unit and the auxiliary unit are each sandwiched from both sides in the longitudinal direction of the vehicle by two of the cross members (cross member 104 and first cross member 141, and first cross member 141 and second cross member 142 in the embodiments).

According to the aforementioned vehicle mounting structure for a fuel cell system, the fuel cell unit and the fuel cell auxiliary unit are surrounded by the floor frames and cross members forming the vehicle skeletal member. Therefore, during a vehicle collision, damage to the fuel cell unit and the fuel cell auxiliary unit can be inhibited, thereby improving the collisional stabilization.

The vehicle mounting structure for a fuel cell system may further include an electrical storage device (capacitor 33 in the embodiment), wherein the auxiliary unit, the fuel cell unit, and the electrical storage device are disposed in that order along the longitudinal direction of the vehicle, and the electrical storage device is sandwiched from both sides in the longitudinal direction of the vehicle by two of the cross members (the second cross member 142 and the third cross member 143 in the embodiment).

The aforementioned vehicle mounting structure for a fuel cell system can prevent the length of piping that circulates reactant gases and the length of piping that circulates a cooling medium disposed between the fuel cell unit and the fuel cell auxiliary unit from becoming excessively long, prevent high voltage electrical wiring arranged between the fuel cell unit and the electrical storage device from becoming excessively long, and reduce the space required for mounting the fuel cell system on a vehicle.

The vehicle mounting structure for a fuel cell system may further include high voltage electrical system auxiliary components (auxiliary unit 50 in the embodiment) and side sills (inside sills 107 and 108 in the embodiment) provided along the longitudinal direction of the vehicle at positions to an outside of the floor frames in the width direction of the vehicle, wherein the high voltage electrical system auxiliary components are disposed in an area sandwiched by the floor frames and the side sills.

According to the aforementioned vehicle mounting structure for a fuel cell system, the high voltage electrical system auxiliary components to which electrical power is supplied from the fuel cell unit and the electrical storage device are disposed in regions sandwiched between the side sills and the floor frame, which can prevent the length of electrical wiring arranged between the fuel cell unit and electrical storage device and the high voltage electrical system auxiliary components from becoming excessively long.

DESCRIPTION OF THE REFERENCE SYMBOLS

10: fuel cell system, 11: fuel cell, 33: capacitor (electrical storage device), 40: auxiliary unit, 50: auxiliary unit, 104: cross member, 105 and 106: floor frame, 107 and 108: inside sill, 141: first cross member, 142: second cross member, 143: third cross member

BEST MODE FOR CARRYING OUT THE INVENTION

The vehicle mounting structure for a fuel cell system according to an embodiment of the present invention will be described below with reference to the attached drawings.

Figure 1:
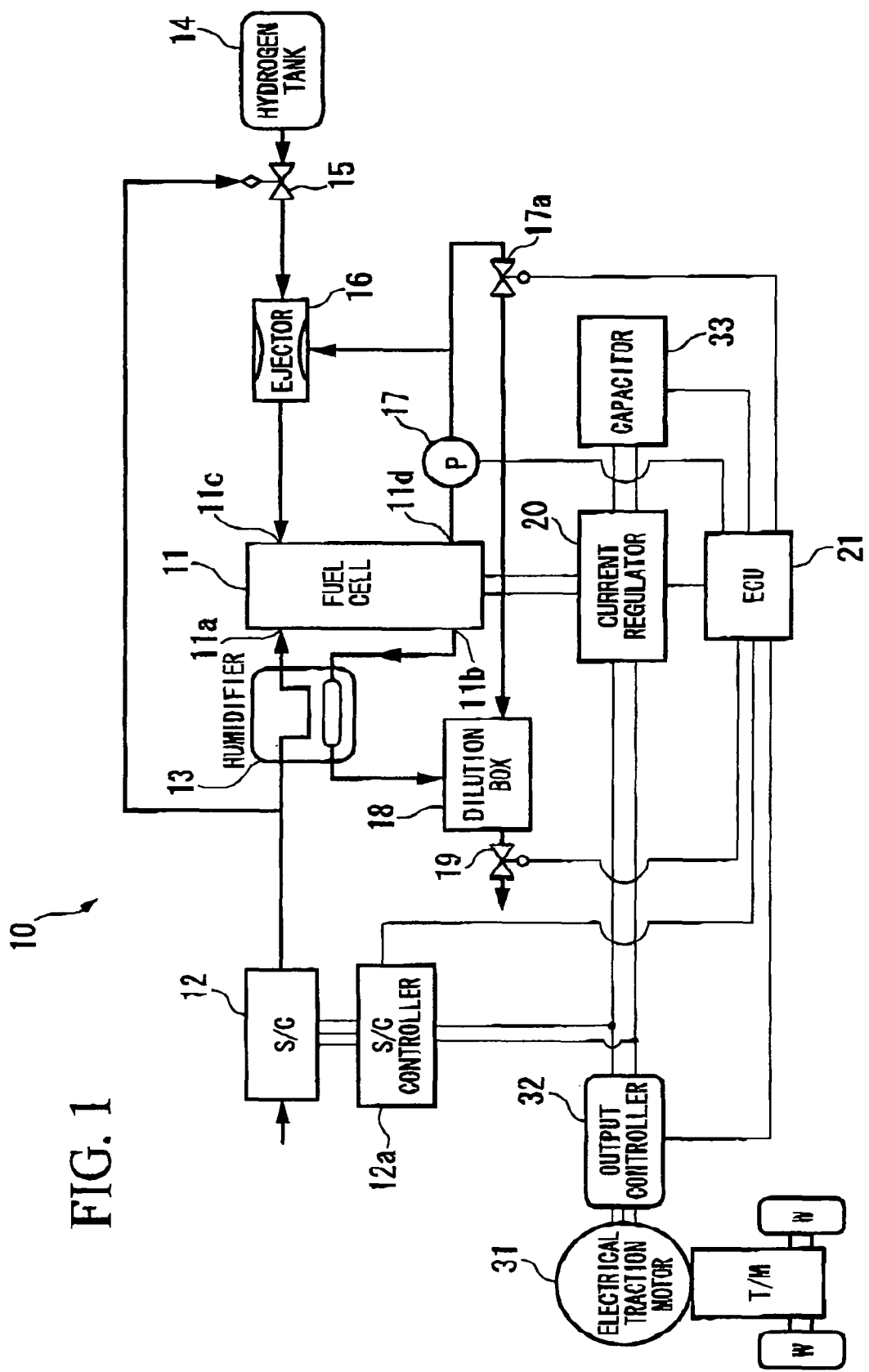
FIG. 1 is a block diagram of a vehicle mounting structure for a fuel cell system according to an embodiment of the present invention.

As shown, for example, in FIG. 1, a fuel cell system 10 according to the present embodiment is constituted by including a fuel cell 11, an air supplying device 12, a humidifier 13, a hydrogen tank 14, a fuel supply control valve 15, an ejector 16, a fuel pump 17, a dilution box 18, a purge valve 19, a current regulator 20, and an electronic control unit (ECU) 21. The fuel cell vehicle in which this fuel cell system 10 is mounted is constituted by including the fuel cell system 10, an electric traction motor 31, a power control unit (PCU) 32, and a capacitor 33.

The fuel cell 11 includes a plurality of fuel cell units held between a pair of separators, with each cell being an electrolyte-electrode assembly including a solid polymer electrolyte membrane made of a positive ion exchange membrane and the like sandwiched between a fuel electrode (anode) inducing an anode catalyst and a gas diffusion layer and an oxygen electrode (cathode) including a cathode catalyst and a gas diffusion layer. The stack of unit fuel cells is sandwiched on both sides in the stacking direction by a pair of end plates.

Air, which is an oxidizing gas (a reactant gas) including oxygen, is supplied from the air supplying device (S/C) 12 and introduced to the cathode of the fuel cell 11 after being suitably humidified by the humidifier 13. Fuel gas (a reactant gas) that contains hydrogen is supplied from the high pressure hydrogen tank 14 via the fuel supply control valve 15 and the ejector 16 to the anode of the fuel cell 11. Hydrogen that is ionized through a catalytic reaction on the anode catalyst of the anode permeates to the cathode via the suitably humidified solid polymer electrolyte membrane. Electrons generated as a result of this movement are extracted to an external circuit and used as direct current electrical energy. The hydrogen ions, electrons, and oxygen combine at the cathode at this time to form water.

The rotational frequency of a motor (not illustrated) that drives the air supplying device (S/C) 12, which is an air compressor and the like, is controlled by an S/C controller 12a equipped with a pulse-width modulated (PWM) inverter based on a control command input from the ECU 21. The S/C controller 12a is connected in parallel with the current regulator 20 and the capacitor 33.

The humidifier 13 is constituted by a water-permeable membrane such as a hollow fiber membrane, and utilizes discharged air that is discharged from an air discharge port 11b of the fuel cell 11 as humidifying gas for air supplied from the air supplying device (S/C) 12 to the air supply portion 11a. That is, when air and discharged air are brought into contact with each other via the water permeable membrane, the moisture contained in the discharged air (particularly, water vapor) is supplied to the air as water vapor after passing through membrane holes of the water-permeable membrane.

Also, the discharged air discharged from the humidifier 13 is fed to the dilution box 18 described below.

The hydrogen serving as the fuel for the fuel cell 11 is supplied from the high pressure hydrogen tank 14 to the fuel supply control valve 15.

The fuel supply control valve 15 is a pneumatic-type proportional pressure control valve. With the pressure of the air supplied from the air supplying device (S/C) 12 serving as a signal pressure, the pressure of the hydrogen at the outlet of the fuel supply control valve 15 after passing through the fuel supply control valve 15 is set to be within a predetermined range in response to the signal pressure.

The hydrogen that has passed the fuel supply control valve 15 flows through the ejector 16 and is then supplied from the hydrogen supply port 11c to the anode of the fuel cell 11.

A portion of the unreacted discharged gas discharged from a hydrogen discharge port 11d of the fuel cell 11 is fed to the ejector 16 via the hydrogen pump 17. There, the hydrogen supplied from the hydrogen tank 14 is mixed with the discharged gas discharged from the fuel cell 11 to then be supplied again to the fuel cell 11.

The ejector 16 absorbs a portion of the discharged gas discharged from the fuel cell 11 as a subsidiary flow by a negative pressure generated in the vicinity of a high speed hydrogen gas stream flowing in the ejector 16. This discharged hydrogen is then mixed with hydrogen supplied from the hydrogen tank 14 to be supplied again to the fuel cell 11, whereby discharged gas discharged from the fuel cell 11 is circulated.

Also, discharged gas discharged from the hydrogen discharge port 11d of the fuel cell 11 passes an exhaust control valve 17a, whose opening and closing is controlled by the ECU 21, and is fed to the dilution box 18.

Simultaneously as discharging water that has collected in the anode of the fuel cell 11 and nitrogen and the like mixed with the hydrogen to the outside, the dilution box 18 reduces the hydrogen concentration of the hydrogen in the discharged unreacted discharged gas to a specified concentration or less by mixing with air discharged from the cathode, and then discharges it to outside (the atmosphere) via the purge valve 19.

The generated current that is extracted from the fuel cell 11 is fed to the current regulator 20, to which is connected the capacitor 33 such as an electric double layer capacitor or electrolytic capacitor serving as an electrical storage device.

The current regulator 20 includes a DC-DC chopper or the like, and controls the current value of the generated electrical current extracted from the fuel cell 11 based on a current command value that is output from the ECU 21, i.e., a power generation command sent to the fuel cell 11.

The fuel cell 11 and The capacitor 33 are connected in parallel to electrical loads such as the output controller 32 that controls the electrical traction motor 31 and the S/C controller 12a that controls the motor (not illustrated) that drives the air supplying device (S/C) 12, through the current regulator 20.

The vehicle mounting structure for a fuel cell system 10 having the aforementioned constitution is explained below referring to FIGS. 2 to 7.

Figure 2:
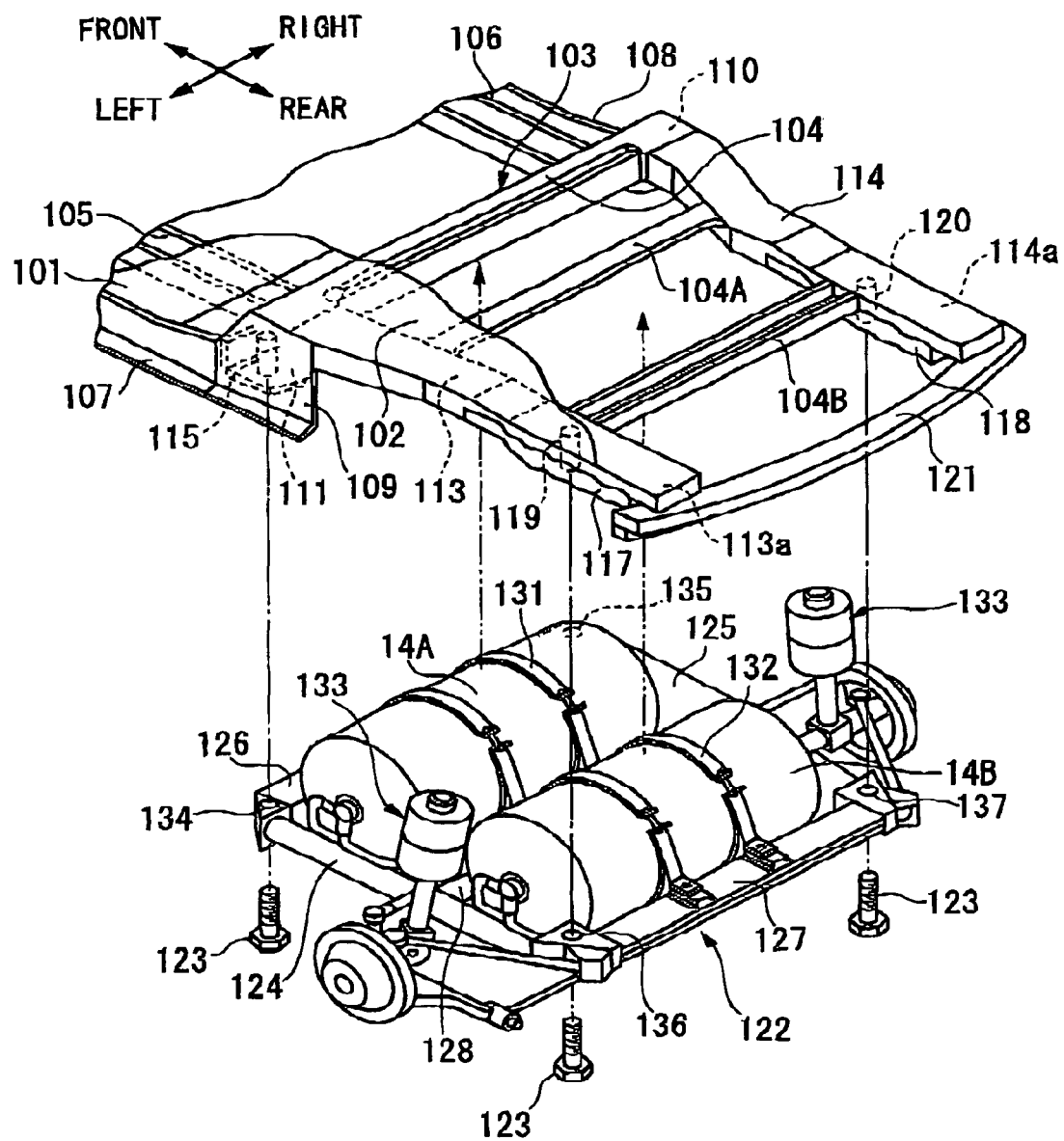
FIG. 2 is a main portion exploded perspective view of the vehicle mounting structure for a fuel cell system shown in FIG. 1.
Figure 3:
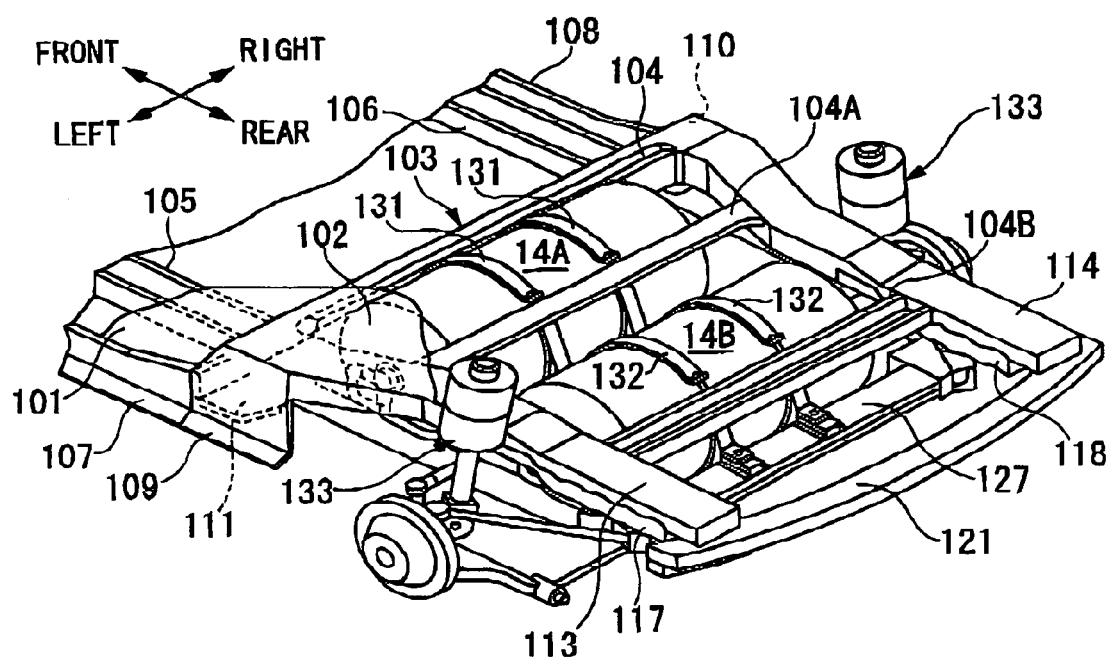
FIG. 3 is a main portion perspective view of the vehicle mounting structure for a fuel cell system shown in FIG. 1.

As shown for example in FIG. 2, a rear floor 102 that is stepped so as to rise up at the rear is joined to the rear edge of a front floor 101 that forms the vehicle floor. A cross member 104 that forms the vehicle skeletal member is joined to the back side of a step portion 103 of the rear floor 102. The floor frames 105 and 106 forming the vehicle skeletal member on the left and right along the longitudinal direction of the vehicle are connected to the outer sides of the lower surface of the front floor 101.

The inside sills 107 and 108 are connected to the left and right side edges, respectively, of the front floor 101, and inside sill extensions 109 and 110 are provided at the rear end portions of the inside sills 107 and 108, respectively. The inside sills 107 and 108 are joined to outside sills that are not illustrated, and are members forming the vehicle skeletal member.

A front bracket 111 is joined to the inner surface of the inside sill extension 109, and a front bracket 112 is joined to the inner surface of the inside sill extension 110.

The front brackets 111 and 112 are joined to the bottom of the rear floor 102, and are joined to the rear frames 113 and 114, the lower surface of the cross member 104, and the floor frames 105 and 106, which are members forming the vehicle skeletal member. Thereby, the front end portions of the rear frames 113 and 114 become connected to the inside sills 107 and 108 and the floor frames 105 and 106 via the front brackets 111 and 112.

A rear bracket 117 is attached to the lower surface of the back end portion of the rear frame 113, and a rear bracket 118 is attached to the lower surface of the back end portion of the rear frame 114.

Here, two cross members 104A and 104B are joined between the left and right rear frames 113 and 114, one in front of the other. A bumper beam 121 is attached to the back end portions thereof, specifically, the rear brackets 117 and 118.

A subframe 122 is fixed from below to collar nuts 115 and 116 provided on the front brackets 111 and 112 and collar nuts 119 and 120 provided on the rear brackets 117 and 118 by bolts 123, 123, 123, and 123.

The subframe 122 is, as shown in FIG. 2, a member formed in a rectangular frame shape by left and right frame members 124 and 125 and front and rear frame members 126 and 127, and provided with a cross beam 128 in the vehicle width direction. Two hydrogen tanks 14A and 14B serving as the hydrogen tank 14 are fixedly fastened to the space divided by this cross beam 128 by bands 131 and 132, respectively. Also, a suspension unit 133 is attached to the subframe 122.

Insertion portions 134 and 135 for bolts 123 to be inserted into the collar nuts 115 and 116 are provided at the corners of the front ends of the left and right frame members 124 and 125 and the front portion frame member 126. Insertion portions 136 and 137 for bolts 123 to be inserted into the collar nuts 119 and 120 are provided at the corners of the rear ends of the left and right frame members 124 and 125 and the rear portion frame member 127.

The bolts 123 are inserted into the insertion portions 134, 135, 136, and 137 of the subframe 122 thus constituted. These bolts 123 are then inserted into the collar nuts 115, 116, 119, and 120 attached to the front brackets 111 and 112 and the rear brackets 117 and 118 of the rear frames 113 and 114 to be fixedly fastened thereto. Thereby, the subframe 122 is fixed to the rear frames 113 and 114.

Figure 4:
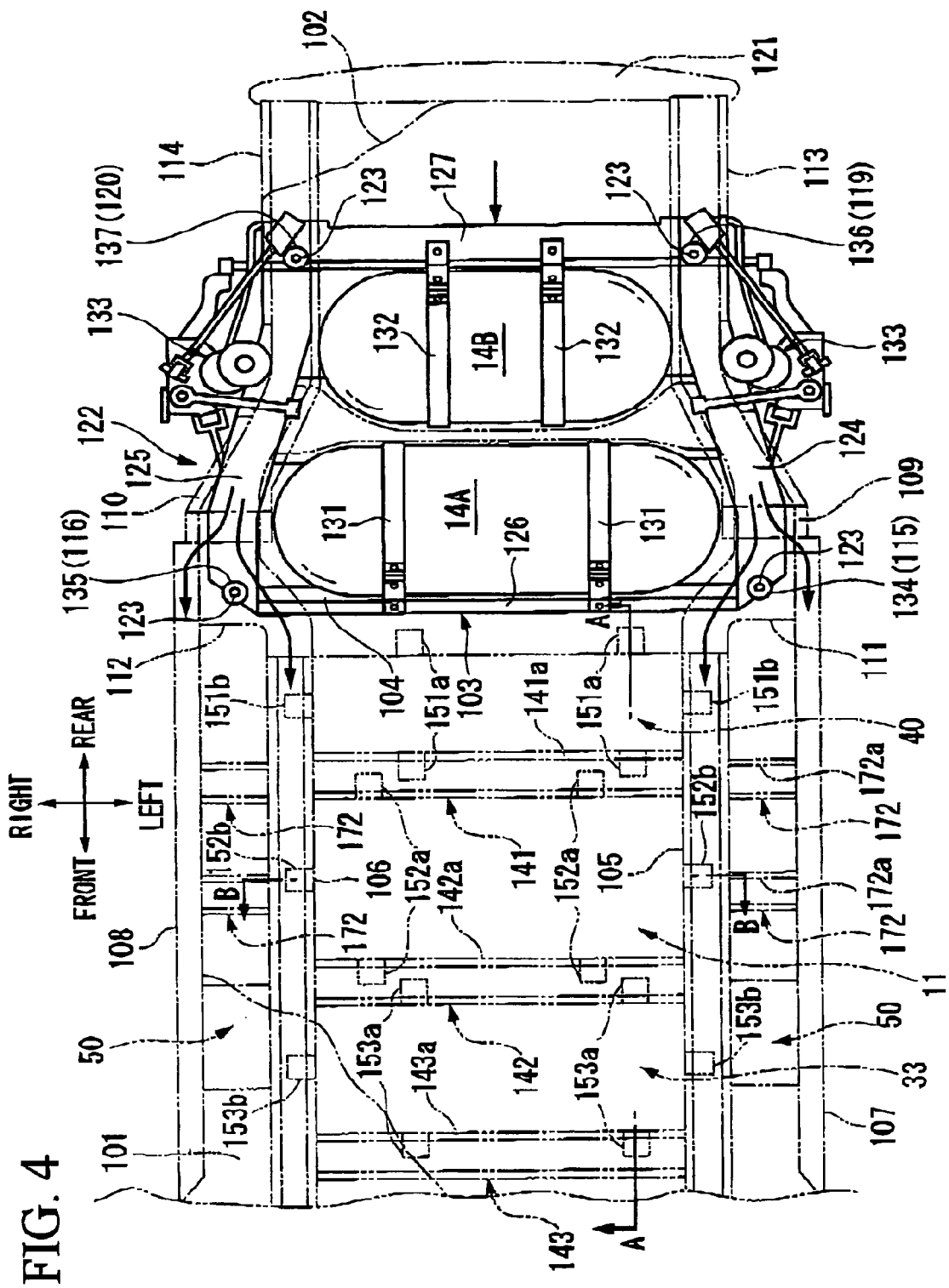
FIG. 4 is a plan view from above to below in the vertical direction of the vehicle of the main portion of the vehicle mounting structure for a fuel cell system shown in FIG. 1.
Figure 5:
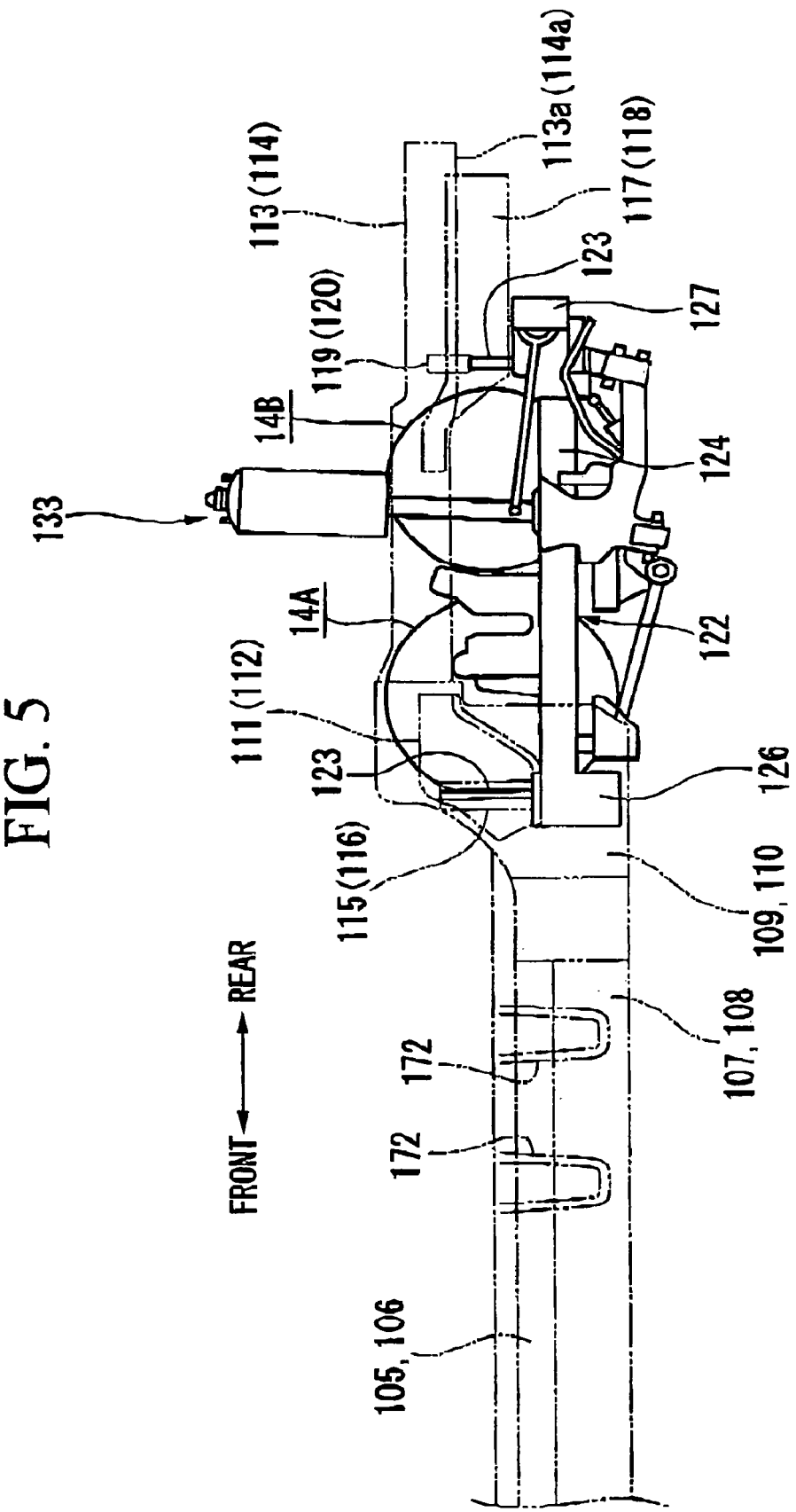
FIG. 5 is a side view along the vehicle width direction of the main portion of the vehicle mounting structure for a fuel cell system shown in FIG. 1.

As shown in FIGS. 4 and 5, below the front floor 101, the auxiliary unit 40 of the fuel cell 11, the fuel cell 11, and the capacitor 33 are disposed in that order from the rear to the from in the longitudinal direction of the vehicle so as to be sandwiched from both sides by the left and right floor frames 105 and 106. The auxiliary unit 40 of the fuel cell 11 is constituted to house, for example, the humidifier 13, the ejector 16, the fuel pump 17, and the dilution box 18 in a single case.

The first through third cross members 141, 142, and 143 forming the vehicle skeletal member that are joined between the left and right floor frames 105 and 106 are joined to the under side of the front floor 101. The first cross member 141 is disposed between the auxiliary unit 40 and the fuel cell 11. The second cross member 142 is disposed between the fuel cell 11 and the capacitor 33. The third cross member 143 is disposed at a position shifted to the front of the capacitor 33 in the longitudinal direction of the vehicle.

Figure 6:
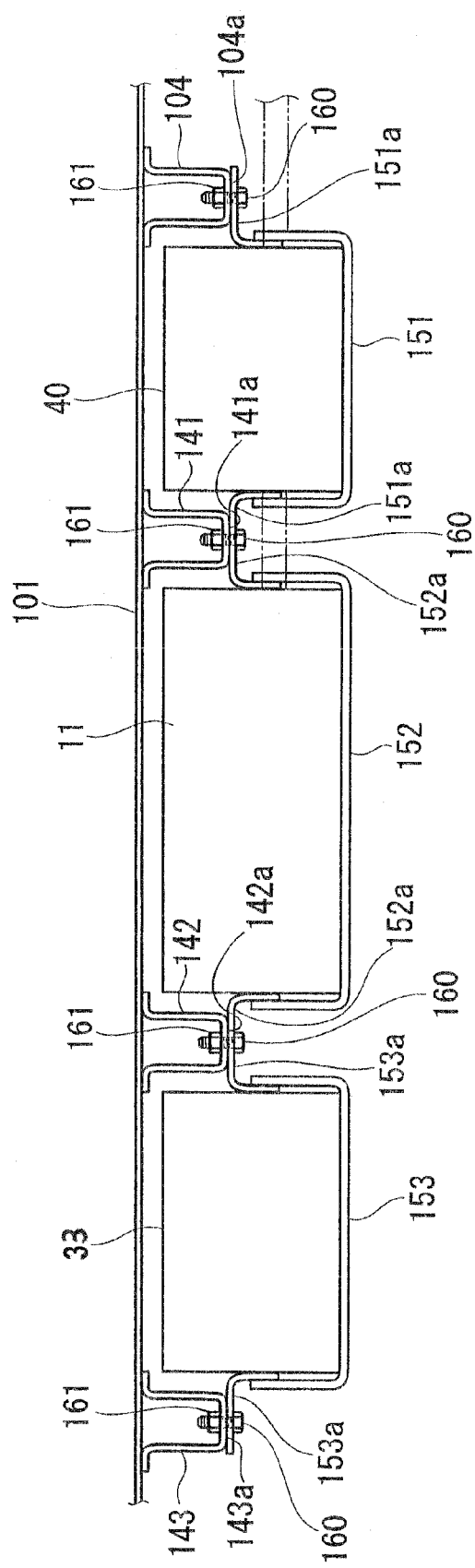
FIG. 6 is a cross-sectional view taken along the line A-A in FIG. 4.
Figure 7:
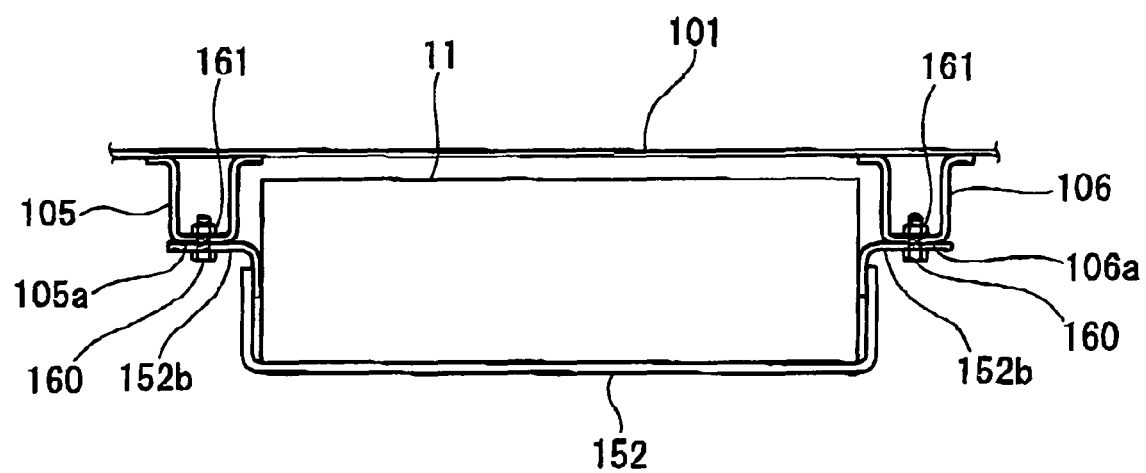
FIG. 7 is a cross-sectional view taken along the line B-B in FIG. 4.

As shown, for example, in FIG. 6, undercovers 151, 152, and 153 that cover the bottom portions of the auxiliary unit 40, the fuel cell 11, and the capacitor 33 are attached to the auxiliary unit 40, the fuel cell 11, and the capacitor 33. Flange portions 151a, 152a, and 153a that are attached to the bottom surfaces of the cross members 141, 142, and 143 are formed on the undercovers 151, 152, and 153, respectively. Also, flange portions 151b, 152b, and 153b that are attached to the bottom surfaces of the floor frames 105 and 106 are formed on the undercovers 151, 152, and 153, respectively.

Bolts 160 inserted from below the bottom wall 104a of the cross member 104 and the bottom wall 141a of the first cross member 141, which have a U-shape when viewed in cross section, and the flange portions 151a of the undercover 151 are fastened to nuts 161. Thereby, the undercover 151 of the auxiliary unit 40 comes to be fixed to the cross member 104 and the first cross member 141.

Similarly, bolts 160 inserted from below the bottom wall 141a of the first cross member 141 and the bottom wall 142a of the second cross member 142, which have a U-shape when viewed in cross section, and the flange portions 152a of the undercover 152 are fastened to nuts 161. Thereby, the undercover 152 of the fuel cell 11 comes to be fixed to the first and second cross members 141 and 142.

Similarly, bolts 160 inserted from below the bottom wall 142a of the second cross member 142 and the bottom wall 143a of the third cross member 143, which have a U-shape when viewed in cross section, and the flange portions 153a of the undercover 153 are fastened to nuts 161. Thereby, the undercover 153 of the capacitor 33 comes to be fixed to the second and third cross members 142 and 143.

Also, bolts 160 inserted from below the bottom wall 105a of the floor frame 105 and the bottom wall 106a of the floor frame 106, which have a U-shape when viewed in cross section, and the flange portions 151b, 152b, and 153b of the undercovers 151, 152, and 153 are fastened to nuts 161. Thereby, the undercovers 151, 152, and 153 come to be fixed to the floor frames 105 and 106.

As shown in FIGS. 4 and 5, a bracket 172 is joined between the left and right floor frames 105 and 106 and the left and right inside sills 107 and 108 at two locations on each side, for a total of four on both sides. The brackets 172 are provided with a flange portion 172a joined to the floor frames 105 and 106, the inside sills 107 and 108 and the under side of the front floor 101.

The high voltage electrical system auxiliary unit 50, which is constituted to house, for example, the current regulator 20 and die PCU 32 in a case, is disposed in the regions sandwiched from both sides by the floor frames 105 and 106 and the inside sills 107 and 108.

An undercover (not illustrated) that covers the bottom portion of the auxiliary unit 50 is attached thereto, and a flange portion (not illustrated) that is joined to the bottom surface of the floor frames 105 and 106 and the inside sills 107 and 108 is formed on this undercover.

As shown for example in FIG. 4, hydrogen piping (not illustrated) that circulates the reactant gas hydrogen runs between the hydrogen tank 14 and the auxiliary unit 40 of the fuel cell 11, and between the auxiliary unit 40 and the fuel cell 11, being arranged along the longitudinal direction of the vehicle.

Also, the fuel cell 11 and the capacitor 33 are connected by high voltage wiring (not illustrated) that is routed along the longitudinal direction of the vehicle.

As stated above, according to the vehicle mounting structure for the fuel cell system 10 of the present embodiment, the fuel cell 11, the auxiliary unit 40 of the fuel cell 11, and the capacitor 33 are surrounded by the floor frames 105 and 106 and the cross members 104, 141, 142, and 143 forming the vehicle skeletal member. Therefore, during a vehicle collision, damage to the fuel cell 11, the auxiliary unit 40, and the capacitor 33 can be inhibited, thereby improving the collisional stabilization.

Moreover, disposing the hydrogen tank 14, the auxiliary unit 40, the fuel cell 11 and the capacitor 33 in that order along the longitudinal direction of the vehicle can prevent the length of the hydrogen piping that circulates a reactant gas and the length of the piping that circulates a cooling medium arranged between the hydrogen tank 14 and the fuel cell 11, or between the fuel cell 11 and the auxiliary unit 40 from becoming excessively long, can prevent the length of high voltage wiring arranged between the fuel cell 11 and the capacitor 33 from becoming excessively long, and can reduce the space required for mounting the fuel cell system 10 on a vehicle.

In the aforementioned embodiment, the undercovers 151, 152, and 153 that cover the bottom portions of the auxiliary unit 40, the fuel cell 11 and the capacitor 33, respectively, were joined to the floor frames 105 and 106 and the cross members 104, 141, 142, and 143, but are not limited thereto. For example, the auxiliary unit 40, the fuel cell 11, and the capacitor 33 may be mounted on a frame formed in a rectangular shape, and in the state of the auxiliary unit 40, the fuel cell 11, and the capacitor 33 being fixed to the frame by bands or the like, the frame may be sandwiched from both sides in the vehicle width direction by the floor frames 105 and 106 and joined to the floor frames 105 and 106 by fastening members such as bolts.

Also, the high voltage electrical system auxiliary unit 50 is not limited to the aforementioned current regulator 20 and the PCU 32, and may be equipped with various accessories for operating the high voltage electrical system. Specifically, it may be provided with an air fan for cooling the capacitor 33 and a current rectifier for the capacitor 33, and a ventilation fan for the fuel cell 11.

INDUSTRIAL APPLICABILITY

According to the vehicle mounting structure for a fuel cell system of the present invention, the fuel cell unit and the fuel cell auxiliary unit are surrounded by the floor frames and cross members forming the vehicle skeletal member. Therefore, during a vehicle collision, damage to the fuel cell unit and the fuel cell auxiliary unit can be inhibited, thereby improving the collisional stabilization.

Moreover, another embodiment of the present invention can prevent the length of the piping that circulates reactant gas and the length of the piping that circulates the cooling medium disposed between the fuel cell unit and the fuel cell auxiliary unit from becoming excessively long, prevent high voltage electrical wiring arranged between the fuel cell unit and the electrical storage device from becoming excessively long, and reduce the space required for mounting a fuel cell system on a vehicle.

Moreover, another embodiment of the present invention can prevent the length of electrical wiring arranged between the fuel cell unit and the electrical storage device and the high voltage accessories from becoming excessively long.

The invention claimed is:

1. A vehicle mounting structure for a fuel cell system having a fuel cell unit and a fuel cell auxiliary unit, comprising:
   a flat floor;
   a pair of floor frames provided on sides of a vehicle body along a longitudinal direction of a vehicle, and joined to an underside of the flat floor;
   cross members provided in a width direction of the vehicle and connected to the pair of floor frames, and joined to the under side of the flat floor;
   a first region defined by the pair of floor frames and a first pair of the cross members, the fuel cell unit being disposed so as to be close to the flat floor in the first region;
   a second region defined by the pair of floor frames and a second pair of the cross members so as to be adjacent to the first region in the longitudinal direction of the vehicle, the fuel cell auxiliary unit being disposed so as to be close to the flat floor in the second region;
   a first pair of brackets sandwiching the fuel cell unit in the longitudinal direction of the vehicle, attached to bottom surfaces of the cross members, and attaching the fuel cell unit to the first pair of the cross members;
   a second pair of brackets sandwiching the fuel cell unit in the width direction of the vehicle, attached to the floor frames, and attaching the fuel cell unit to the pair of floor frames; and
   an under cover covering a bottom portion of the fuel cell unit,
   wherein each of the first pair of brackets and the second pair of brackets is configured to be a flange extending from the under cover.

2. A vehicle mounting structure for a fuel cell system according to claim 1, further comprising an electrical storage device, wherein the auxiliary unit, the fuel cell unit, and the electrical storage device are disposed in that order along the longitudinal direction of the vehicle, and the electrical storage device is sandwiched from both sides in the longitudinal direction of the vehicle by two of the cross members.

3. A vehicle mounting structure for a fuel cell system according to claim 2, further comprising: high voltage electrical system auxiliary components; and side sills provided along the longitudinal direction of the vehicle at positions to an outside of the floor frames in the width direction of the vehicle, wherein the high voltage electrical system auxiliary components are disposed in an area between the floor frames and the side sills.

4. A vehicle mounting structure for a fuel cell system according to claim 1, further comprising: high voltage electrical system auxiliary components; and side sills provided along the longitudinal direction of the vehicle at positions to an outside of the floor frames in the width direction of the vehicle, wherein the high voltage electrical system auxiliary components are disposed in an area between the floor frames and the side sills.

5. A vehicle mounting structure for a fuel cell system according to claim 1, wherein at least a portion of the flange is provided between the fuel cell and the under cover.

6. A vehicle mounting structure for a fuel cell system according to claim 1, wherein at least one of the cross members has a U shape when viewed in cross-section.

* * * * *